(12) United States Patent
Elshafie et al.

(10) Patent No.: US 12,335,010 B2
(45) Date of Patent: Jun. 17, 2025

(54) SIGNALING USER EQUIPMENT ANTENNA GROUP PREFERENCES AND ANTENNA GROUP CORRELATION

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Runxin Wang, San Diego, CA (US); Yu Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/547,265

(22) PCT Filed: Apr. 15, 2021

(86) PCT No.: PCT/CN2021/087389
§ 371 (c)(1),
(2) Date: Aug. 21, 2023

(87) PCT Pub. No.: WO2022/217524
PCT Pub. Date: Oct. 20, 2022

(65) Prior Publication Data
US 2024/0171249 A1    May 23, 2024

(51) Int. Cl.
*H04L 5/12*       (2006.01)
*H04B 7/0404*     (2017.01)
(Continued)

(52) U.S. Cl.
CPC ......... *H04B 7/0691* (2013.01); *H04B 7/0404* (2013.01); *H04L 5/0048* (2013.01)

(58) Field of Classification Search
CPC .... H04B 7/0691; H04B 7/0404; H04L 5/0048
(Continued)

(56) References Cited

U.S. PATENT DOCUMENTS

2013/0083683 A1*  4/2013  Hwang .............. H04W 64/00
                                                   370/252
2016/0315683 A1   10/2016  Liu et al.
(Continued)

FOREIGN PATENT DOCUMENTS

WO    WO-2019191915 A1 * 10/2019 ........... H04B 7/0473

OTHER PUBLICATIONS

International Search Report and Written Opinion—PCT/CN2021/087389—ISA/EPO—Sep. 28, 2021.

*Primary Examiner* — Helene E Tayong
(74) *Attorney, Agent, or Firm* — Harrity & Harrity LLP/Qualcomm Incorporated

(57) ABSTRACT

Various aspects of the present disclosure generally relate to wireless communication. In some aspects, a base station may transmit, and a user equipment (UE) may receive, a sounding reference signal (SRS) configuration that indicates a reference group among multiple antenna groups of an antenna array associated with the UE. The UE may transmit an SRS using one or more antennas in the reference group. The UE may transmit, to the base station, a correlation report that indicates an inter-group correlation between the multiple antenna groups associated with the UE. The base station may estimate a channel matrix for the multiple antenna groups based at least in part on the inter-group correlation and measurements of the SRS that is transmitted using the one or more antennas in the reference group. Numerous other aspects are described.

30 Claims, 11 Drawing Sheets

(51) Int. Cl.
*H04B 7/06* (2006.01)
*H04L 5/00* (2006.01)

(58) Field of Classification Search
USPC .......................................................... 375/262
See application file for complete search history.

(56) References Cited

U.S. PATENT DOCUMENTS

2017/0288897 A1* 10/2017 You ........................ G01S 5/0252
2020/0259683 A1*  8/2020 Manolakos ............ H04W 64/00

* cited by examiner

SIGNALING USER EQUIPMENT ANTENNA GROUP PREFERENCES AND ANTENNA GROUP CORRELATION

CROSS-REFERENCE TO RELATED APPLICATION

This application is a 371 national stage of Patent Cooperation Treaty (PCT) Application No. PCT/CN2021/087389 filed on Apr. 15, 2021, entitled "SIGNALING USER EQUIPMENT ANTENNA GROUP PREFERENCES AND ANTENNA GROUP CORRELATION," which is hereby expressly incorporated by reference herein.

FIELD OF THE DISCLOSURE

Aspects of the present disclosure generally relate to wireless communication and to techniques and apparatuses for signaling user equipment (UE) antenna group preferences and antenna group correlation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, a transceiver comprising an antenna array, and one or more processors, coupled to the memory and the transceiver, configured to: receive, from a base station, via the transceiver, a sounding reference signal (SRS) configuration that indicates a reference group among multiple antenna groups of the antenna array; transmit via the transceiver, an SRS using one or more antennas in the reference group; and transmit, to the base station, via the transceiver, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

In some aspects, a base station for wireless communication includes a memory, a transceiver, and one or more processors, coupled to the memory and the transceiver, configured to: transmit, to a UE, via the transceiver, an SRS configuration that indicates a reference group among multiple antenna groups of an antenna array associated with the UE; receive, from the UE, via the transceiver, a correlation report that indicates an inter-group correlation between the multiple antenna groups associated with the UE; and estimate a channel matrix for the multiple antenna groups associated with the UE based at least in part on the inter-group correlation and measurements of an SRS that is transmitted by the UE using one or more antennas in the reference group.

In some aspects, a method of wireless communication performed by a UE includes receiving, from a base station, an SRS configuration that indicates a reference group among multiple antenna groups of an antenna array associated with the UE; transmitting an SRS using one or more antennas in the reference group; and transmitting, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

In some aspects, a method of wireless communication performed by a base station includes transmitting, to a UE, an SRS configuration that indicates a reference group among multiple antenna groups of an antenna array associated with the UE; receiving, from the UE, a correlation report that indicates an inter-group correlation between the multiple antenna groups associated with the UE; and estimating a channel matrix for the multiple antenna groups associated with the UE based at least in part on the inter-group correlation and measurements of an SRS that is transmitted by the UE using one or more antennas in the reference group.

In some aspects, a non-transitory computer-readable medium storing a set of instructions for wireless communication includes one or more instructions that, when executed by one or more processors of a UE, cause the UE to: receive, from a base station, an SRS configuration that indicates a reference group among multiple antenna groups of an antenna array associated with the UE; transmit an SRS using one or more antennas in the reference group; and transmit, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

In some aspects, a non-transitory computer-readable medium storing a set of instructions for wireless communication includes one or more instructions that, when executed by one or more processors of a base station, cause the base station to: transmit, to a UE, an SRS configuration that indicates a reference group among multiple antenna groups of an antenna array associated with the UE; receive, from the UE, a correlation report that indicates an inter-group correlation between the multiple antenna groups associated with the UE; and estimate a channel matrix for the multiple antenna groups associated with the UE based at least in part on the inter-group correlation and measurements of an SRS that is transmitted by the UE using one or more antennas in the reference group.

In some aspects, an apparatus for wireless communication includes means for receiving, from a base station, an SRS configuration that indicates a reference group among multiple antenna groups of an antenna array associated with the apparatus; means for transmitting an SRS using one or more antennas in the reference group; and means for transmitting, to the base station, a correlation report that indicates an inter-group correlation between the multiple antenna groups associated with the apparatus to enable the base station to estimate a channel matrix for the multiple antenna groups based at least in part on the SRS that is transmitted using the one or more antennas in the reference group.

In some aspects, an apparatus for wireless communication includes means for transmitting, to a UE, an SRS configuration that indicates a reference group among multiple antenna groups of an antenna array associated with the UE; means for receiving, from the UE, a correlation report that indicates an inter-group correlation between the multiple antenna groups associated with the UE; and means for estimating a channel matrix for the multiple antenna groups associated with the UE based at least in part on the inter-group correlation and measurements of an SRS that is transmitted by the UE using one or more antennas in the reference group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
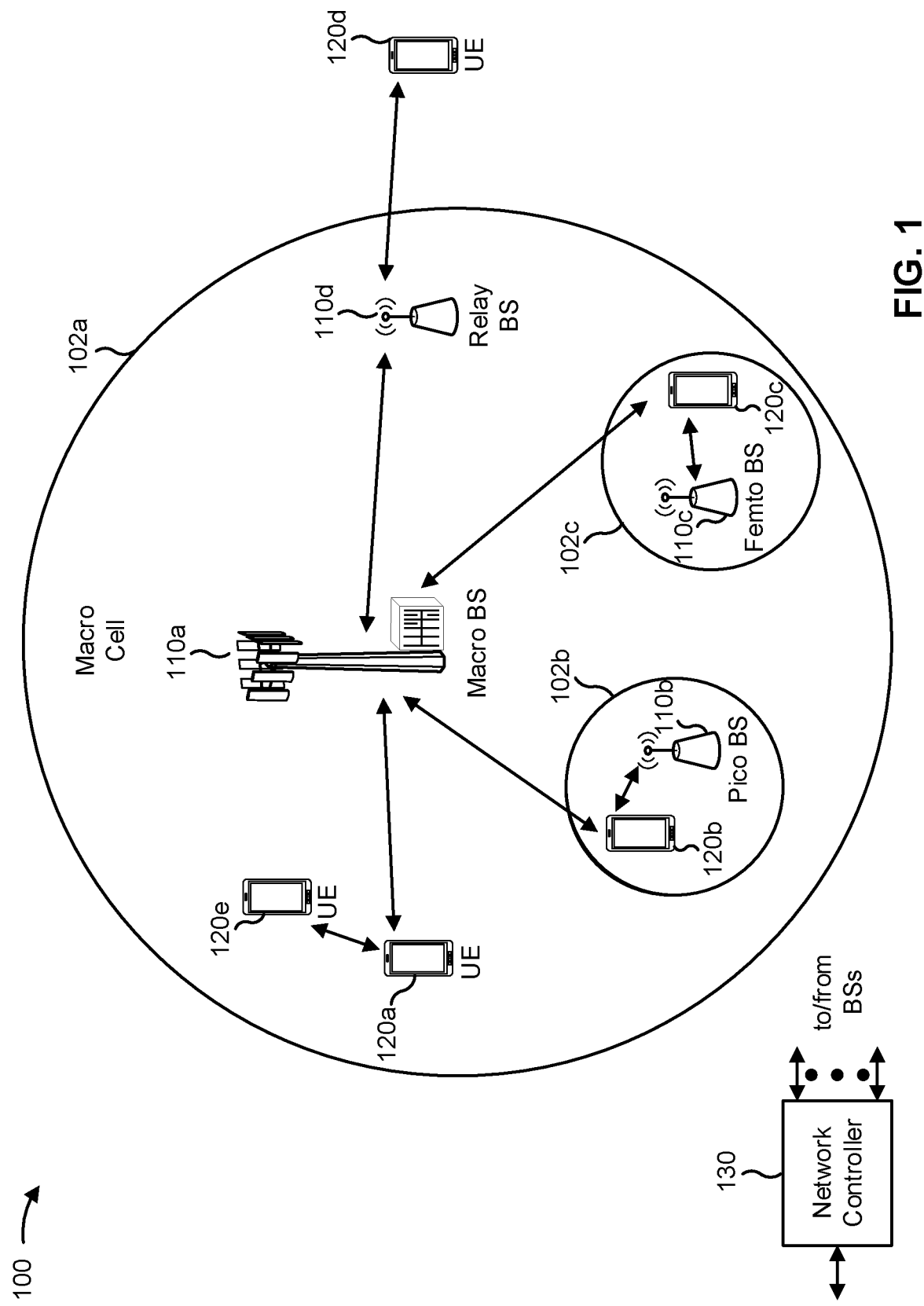
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
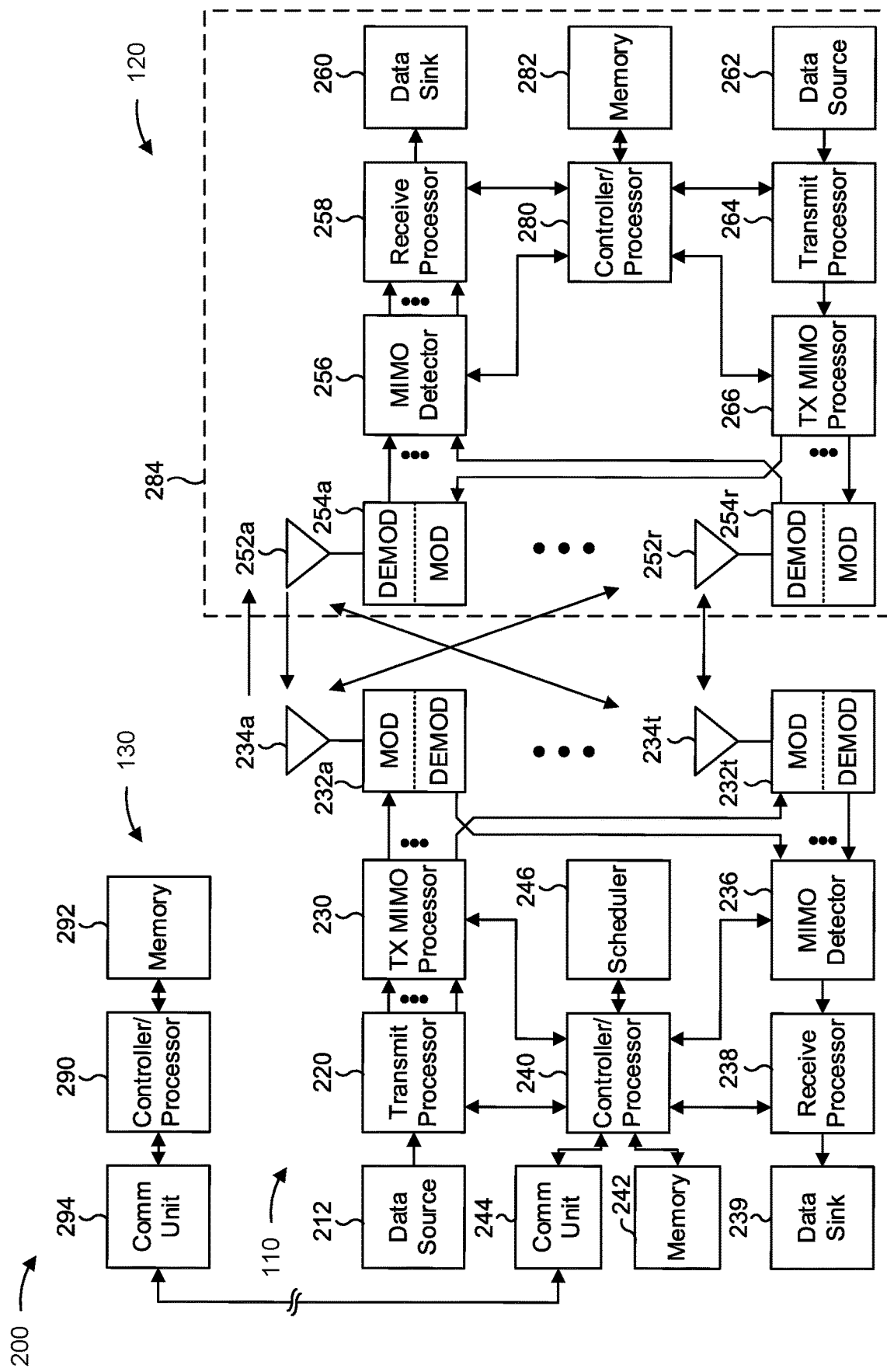
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. For example, the transceiver can include an array of antenna(s) 252. The transceiver may be used by a processor (e.g., controller/processor 280) and memory 282 to perform aspects of any of the methods described herein (e.g., as described with reference to FIGS. 5A-5B, FIG. 6, and/or FIG. 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 5A-5B, FIG. 6, and/or FIG. 7).

Controller/processor 240 of base station 110, controller/processor 280 of UE 120, and/or any other component(s) of FIG. 2 may perform one or more techniques associated with signaling UE antenna group preferences and antenna group correlation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving, from the base station 110, a sounding reference signal (SRS) configuration that indicates a reference group among multiple antenna groups of an antenna array associated with the UE 120 (e.g., using antenna 252, DEMOD 254, MIMO detector 256, receive processor 258, controller/processor 280, memory 282, or the like); means for transmitting an SRS using one or more antennas in the reference group (e.g., using controller/processor 280, transmit processor 264, TX MIMO processor 266, MOD 254, antenna 252, memory 282, or the like); and/or means for transmitting, to the base station 110, a correlation report that indicates an inter-group correlation between the multiple antenna groups associated with the UE 120 (e.g., using controller/processor 280, transmit processor 264, TX MIMO processor 266, MOD 254, antenna 252, memory 282, or the like) to enable the base station 110 to estimate a channel matrix for the multiple antenna groups based at least in part on the SRS that is transmitted using the one or more antennas in the reference group. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to the UE 120, an SRS configuration that indicates a reference group among multiple antenna groups of an antenna array associated with the UE 120 (e.g., using controller/processor 240, transmit processor 220, TX MIMO processor 230, MOD 232, antenna 234, memory 242, or the like); means for receiving, from the UE 120, a correlation report that indicates an inter-group correlation between the multiple antenna groups associated with the UE 120 (e.g., using antenna 234, DEMOD 232, MIMO detector 236, receive processor 238, controller/processor 240, memory 242, or the like); and/or means for estimating a channel matrix for the multiple antenna groups associated with the UE 120 based at least in part on the inter-group correlation and measurements of an SRS that is transmitted by the UE 120 using one or more antennas in the reference group (e.g., using controller/processor 240, memory 242, or the like). The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
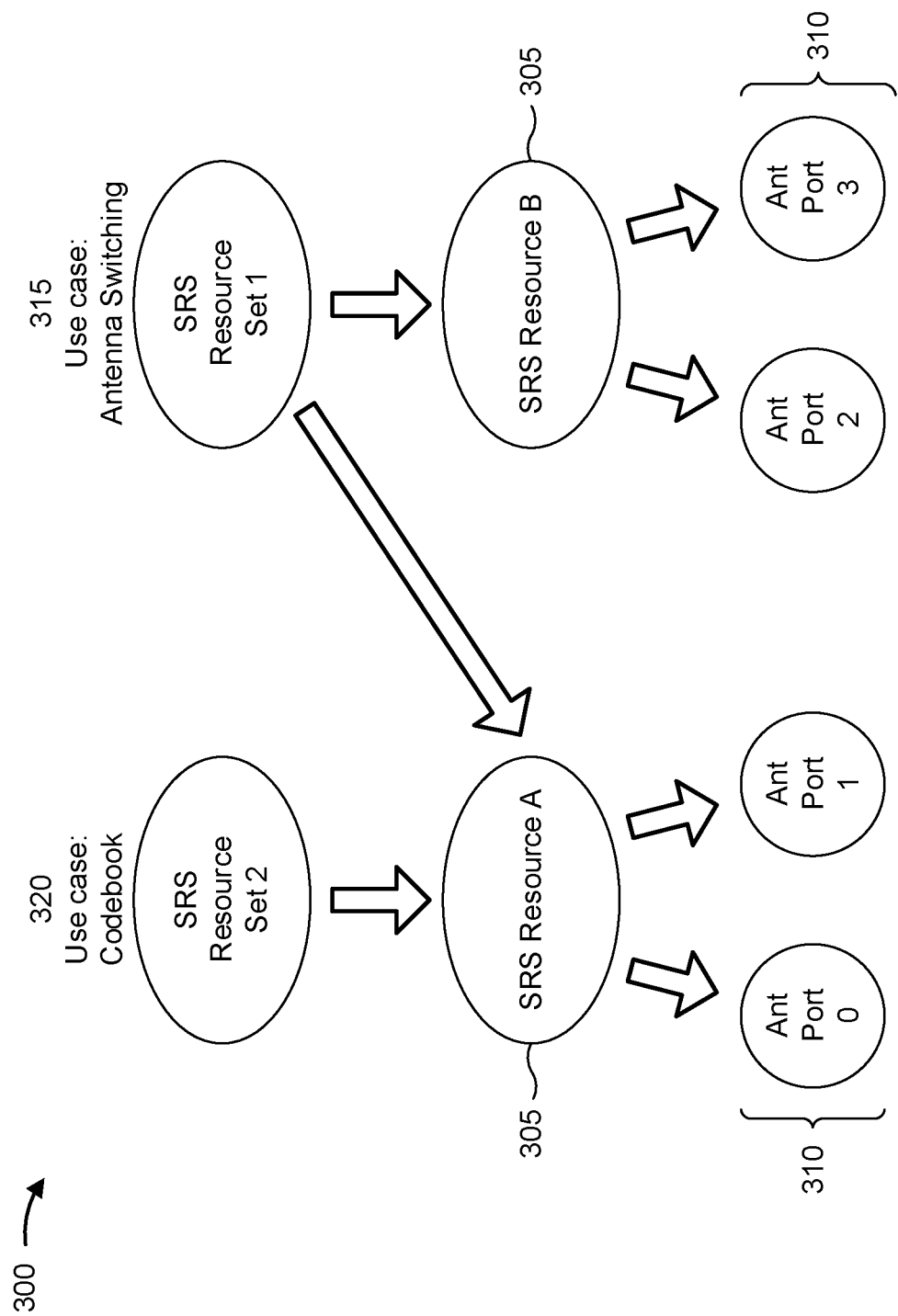
FIG. 3 is a diagram illustrating an example of sounding reference signal (SRS) resource sets, in accordance with the present disclosure.

FIG. 3 is a diagram illustrating an example 300 of SRS resource sets, in accordance with the present disclosure. For example, an SRS may generally carry information that a base station may use for uplink channel estimation, which may be used for scheduling, link adaptation, precoder selection, or beam management, among other examples. The base station may configure one or more SRS resource sets for a UE, and the UE may transmit SRSs on the configured SRS resource sets. As described in further detail herein, an SRS resource set may have a configured usage, such as acquisition of uplink channel state information (CSI) (e.g., information that relates to properties of a communication link and represents a combined effect of scattering, fading, and/or path loss, among other examples), acquisition of downlink CSI (e.g., for reciprocity-based operations where properties of a downlink channel can be inferred from properties of an uplink channel), or uplink beam management, among other examples. The base station may measure the SRSs to obtain SRS measurements, may perform channel estimation based at least in part on the SRS measurements, and may use the SRS measurements to configure communications with the UE 120.

In some aspects, as described above, a base station may configure a UE with one or more SRS resource sets to allocate resources for SRS transmissions by the UE. For example, a configuration for SRS resource sets may be indicated in a radio resource control (RRC) message (e.g., an RRC configuration message or an RRC reconfiguration message) or another suitable message (e.g., a medium access control (MAC) control element (MAC-CE) and/or downlink control information (DCI)). As shown by reference number 305, an SRS resource set may include one or more resources (e.g., shown as SRS resources), which may include time resources and/or frequency resources (e.g., a slot, a symbol, a resource block, and/or a periodicity for the time resources) in which the UE is to transmit an SRS.

As shown by reference number 310, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in the indicated time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management, among other examples.

An antenna switching SRS resource set may be used to enable the base station to estimate downlink CSI in cases where there is reciprocity between an uplink channel and a downlink channel. For example, when there is reciprocity between an uplink channel and a downlink channel, a base station may use an antenna switching SRS (e.g., an SRS transmitted using a resource of an antenna switching SRS resource set) to perform uplink channel estimation that can then be used as downlink CSI (e.g., to determine a downlink precoder to be used to communicate with the UE on a downlink).

A codebook SRS resource set may be used to enable uplink CSI estimation at a base station when the base station indicates an uplink precoder to the UE. For example, when the base station is configured to indicate an uplink precoder to the UE (e.g., using a precoder codebook), the base station may use a codebook SRS (e.g., an SRS transmitted using a resource of a codebook SRS resource set) to estimate uplink CSI (e.g., to determine an uplink precoder to be indicated to the UE and used by the ULE to communicate with the base station on an uplink). In some aspects, virtual ports (e.g., a combination of two or more antenna ports) with a maximum transmit power may be supported at least for a codebook SRS.

A non-codebook SRS resource set may be used to enable uplink CSI estimation at a base station when the UE selects an uplink precoder (e.g., instead of the base station indicated an uplink precoder to be used by the UE). For example, when the UE is configured to select an uplink precoder, the base station may use a non-codebook SRS (e.g., an SRS transmitted using a resource of a non-codebook SRS resource set) to estimate uplink CSI. In this case, the non-codebook SRS may be precoded using a precoder selected by the UE (e.g., which may be indicated to the base station).

A beam management SRS resource set may be used to enable CSI estimation at a base station for millimeter wave communications (e.g., to enable beam selection, beam refinement, and/or beam failure recovery based on uplink channel conditions).

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC-CE). An aperiodic SRS resource may be triggered dynamically, such as via DCI (e.g., UE-specific DCI or group common DCI) or a MAC-CE.

In some aspects, the UE may be configured with a mapping between SRS ports (e.g., antenna ports) and corresponding SRS resources. The UE may transmit an SRS on a particular SRS resource using an SRS port indicated in the configuration. In some aspects, an SRS resource may span N adjacent symbols within a slot (e.g., where N equals 1, 2, or 4). The UE may be configured with X SRS ports (e.g., where $X \leq 4$). In some aspects, each of the X SRS ports may be mapped to a corresponding symbol of the SRS resource and used for transmission of an SRS in that symbol.

As shown in FIG. 3, in some aspects, different SRS resource sets indicated to the UE (e.g., having different use cases) may overlap (e.g., in time and/or in frequency, such as in the same slot). For example, as shown by reference number 315, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRSs may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 320, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE may not transmit codebook SRSs in SRS Resource B (e.g., the second time-frequency resource) using antenna port 2 and antenna port 3.

As indicated above, FIG. 3 is provided as an example. Other examples may differ from what is described with regard to FIG. 3.

Figure 4A:
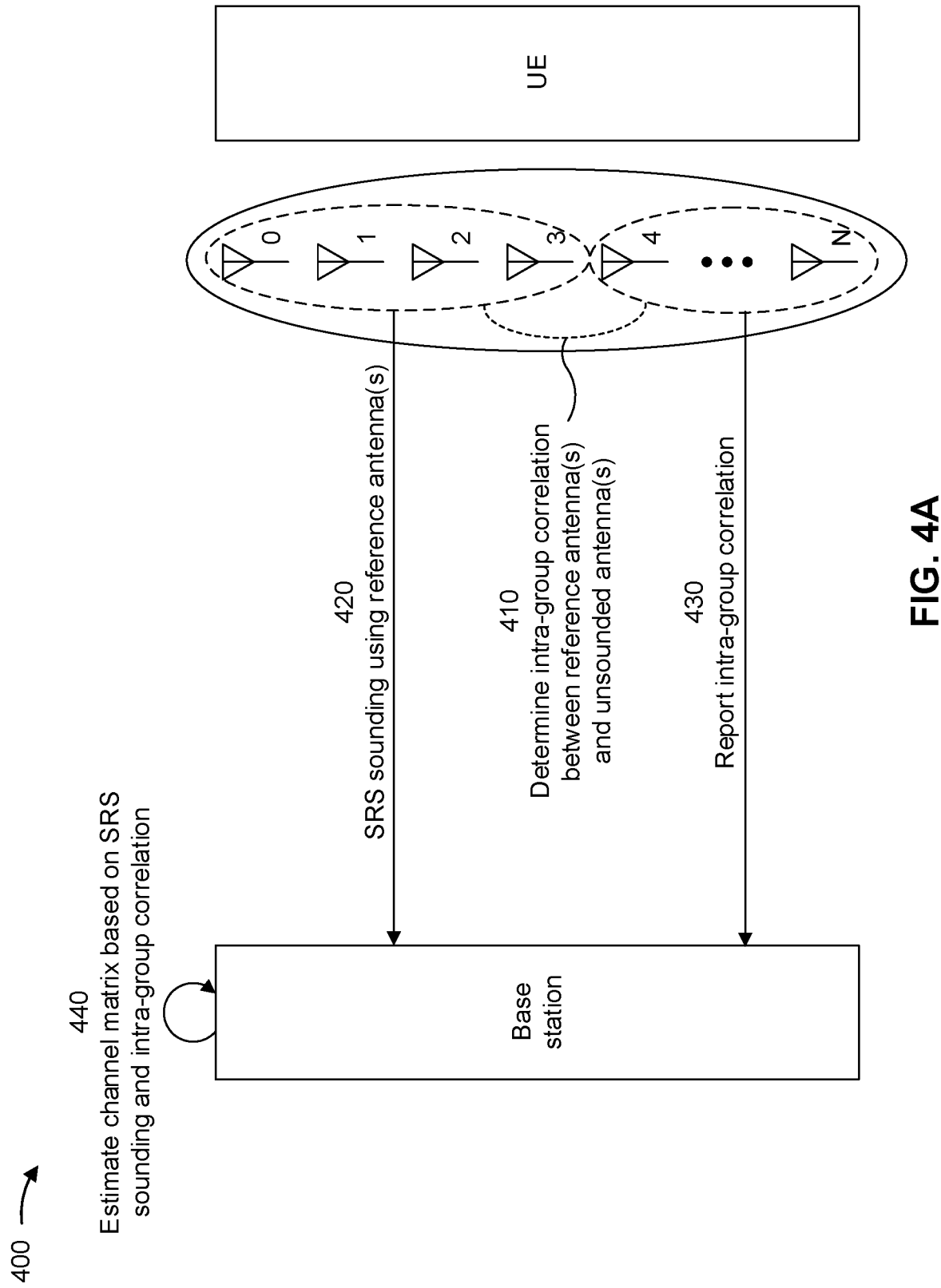
FIGS. 4A-4B are diagrams illustrating an example of UE-assisted channel reconstruction based on partial spatial sounding, in accordance with the present disclosure.
Figure 4B:
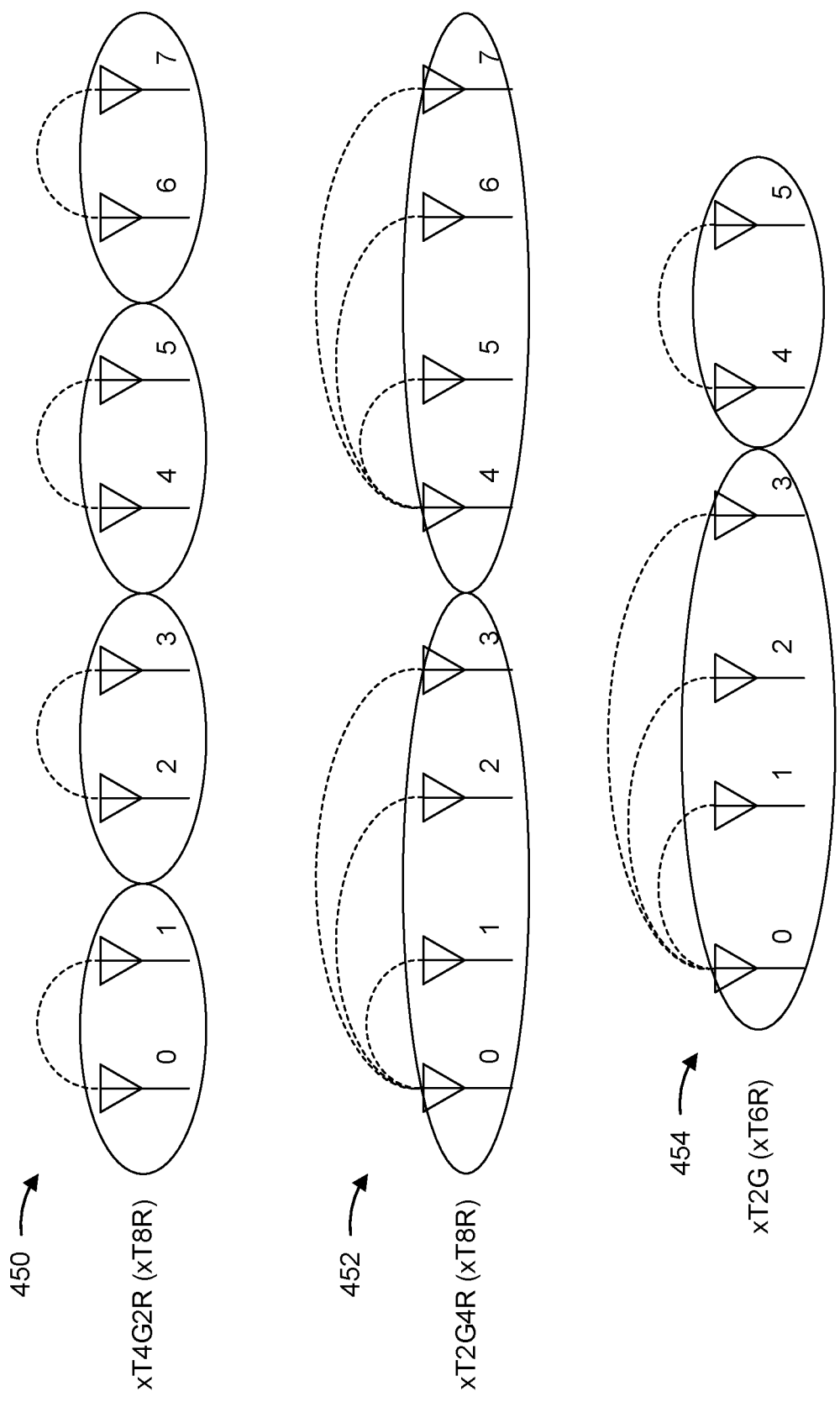

FIGS. 4A-4B are diagrams illustrating an example 400 of UE-assisted channel reconstruction based on partial spatial sounding, in accordance with the present disclosure. As shown in FIG. 4A, example 400 includes communication between a base station (e.g., base station 110) and a UE (e.g., UE 120), which may be included in a wireless network (e.g., wireless network 100). In some aspects, as described herein, the base station may configure the UE to transmit an SRS that carries information that the base station may use for uplink channel estimation. For example, as described above, the base station may configure the UE with one or more SRS resource sets that include one or more time and/or frequency resources in which the UE is to transmit an SRS, one or more antenna ports that the UE is to use to transmit the SRS, and/or a use case for the SRS (e.g., antenna switching, codebook, non-codebook, or beam management).

In some aspects, as shown, the UE may be equipped with an antenna array that includes multiple antennas that can be configured as receive (Rx) antennas (e.g., four antennas, six antennas, or eight antennas, among other examples). In a typical SRS configuration, the base station may configure the UE to sound each antenna in the antenna array (e.g., transmit the SRS using each antenna in the antenna array). However, configuring the UE to send the SRS from each antenna in the antenna array may consume significant power at the UE and/or lead to large insertion loss (e.g., loss of signal power resulting from the insertion of an antenna in a transmission line). For example, an increase in the number of antennas in the antenna array may generally cause uplink sounding to consume more time and/or power resources, in addition to reducing performance due to the insertion loss caused by sounding all of the antennas.

Accordingly, in some aspects, the UE may perform partial spatial sounding, whereby the UE transmits an SRS using a proper subset of the antennas in the antenna array such that the UE refrains from using one or more antennas in the antenna array when transmitting the SRS (e.g., the antenna array includes one or more antennas that are not sounded or otherwise used to transmit the SRS). For example, the UE may perform partial spatial sounding in cases where a fixed relationship exists between different antennas and/or different groups of antennas, and the UE can report information to assist the base station with full channel reconstruction, without transmitting the SRS using one or more antennas. For example, as described herein, the UE may perform partial spatial sounding using one or more reference antennas, and may report additional intra-group correlation information to the base station. In this way, the base station may estimate or otherwise reconstruct a full channel matrix for all of the antennas in the antenna array based on measurements of the partial spatial sounding using one or more reference antennas in combination with the intra-group correlation information, which may result in comparable performance as sounding all of the antennas while also reducing time and/or power resources consumed by the SRS transmission.

For example, as shown in FIG. 4A, and by reference number 410, the UE may divide the antenna array into one or more antenna groups, and may determine an intra-group correlation between one or more reference antennas and one or more unsounded antennas in each antenna group. In particular, as described herein, the antenna groups may each include one or more reference antennas that are sounded when the UE performs an SRS transmission (e.g., used for the SRS transmission) and one or more unsounded antennas that are not used when the UE performs the SRS transmission. For example, as shown in FIG. 4A, the UE may be equipped with an antenna array that includes N antennas, where N is generally greater than or equal to four (e.g., six or eight in the example 400 shown in FIG. 4A). Accordingly, as shown in FIG. 4A, the antenna array is structured as one antenna group, where the first four antennas (0 through 3) are configured as reference antennas to be used for SRS transmission and the remaining antennas (4 through N) are unsounded antennas that are not used for SRS transmission. The UE may therefore determine an intra-group correlation between the reference antenna(s) and the unsounded antenna(s) (e.g., based on measurements of a downlink reference signal, such as a channel state information reference signal (CSI-RS)), which the base station may use in combination with measurements of the SRS that is transmitted using the reference antennas to estimate the full channel matrix.

For example, as shown in FIG. 4A, and by reference number 420, the UE may perform partial spatial sounding by transmitting an SRS using only the one or more reference antennas in an antenna group. As further shown in FIG. 4A, and by reference number 430, the UE may transmit, to the base station, a report that indicates the intra-group correlation among the antennas within each antenna group. Accordingly, as shown by reference number 440, the base station may perform interpolation and/or extrapolation based on measurements of the SRS that is transmitted using the one or more reference antennas and the intra-group correlation between the reference antenna(s) and the unsounded antenna(s) in order to estimate the full channel matrix for all of the antennas in the antenna group. For example, the base station may estimate channels h0-h3 for reference antennas 0-3 based on the uplink sounding performed using the reference antennas, and may estimate channels h4-hN for unsounded antennas 4-N based on the estimated channels h0-h3 and the intra-group correlation between reference antennas 0-3 and unsounded antennas 4-N.

In some aspects, in order to enable partial spatial sounding, the UE may report an SRS grouping capability to the base station (e.g., together with reporting an SRS antenna switching capability), and the UE and the base station may coordinate an antenna grouping structure to configure a number of antenna groups and/or a number of antennas per antenna group, where the antenna grouping structure may be uniform (e.g., an equal number of antennas per antenna group) or the antenna grouping structure may be non-uniform (e.g., where different antenna groups have different numbers of antennas). Additionally, or alternatively, the antenna grouping structure coordinated between the UE and the base station may indicate which antennas are included in each antenna group. For example, referring to FIG. 4B, reference numbers 450 and 452 refer to uniform antenna grouping structures that may be represented using the expression xTyGzR, where x is a number of transmit (Tx) antennas available for each SRS (e.g., depending on a number of Tx chains equipped at the UE), y is a number of groups of antenna ports, z is a number of receive (Rx) antennas in each group, and the expression xTyGzR for partial spatial sounding corresponds to the expression xTzR for SRS antenna switching. For example, as shown by reference number 450, the expression xT4G2R may represent a uniform antenna grouping for an antenna array that has eight (8) Rx antennas (xT8R for SRS antenna switching) divided into four (4) groups that each include two (2) Rx antennas, one or more of which may be configured as reference antennas. In another example, as shown by reference number 452, the expression xT2G4R may represent a uniform antenna grouping for an antenna array that has eight (8) Rx antennas (xT8R for SRS antenna switching), except in this case the antenna array is divided into two (2) groups that each include four (4) Rx antennas, one or more of which may be configured as reference antennas. Alternatively, reference number 454 refers to an example of a non-uniform antenna grouping, where an antenna array that has six (6) Rx antennas (xT6R for SRS antenna switching) is divided into a first group that includes four (4) Rx antennas and a second group that includes two (2) Rx antennas, with one or more antennas in each group configured as reference antennas.

Accordingly, in some aspects, UE-assisted channel reconstruction based on partial spatial sounding may generally include dividing an antenna array associated with a UE into one or more antenna groups, configuring one or more (but not all) of the antennas in each antenna group as reference antennas, and configuring the UE to sound only the one or more reference antennas in each antenna group when transmitting an SRS. Furthermore, the UE may report an intra-group correlation between the reference antenna(s) and the unsounded antenna(s) in each antenna group to the base station to provide assistance information that the base station can use to perform full channel reconstruction. For example, in the uniform grouping shown by reference number 450, the UE may report intra-group correlations between reference antenna 0 and unsounded antenna 1, between reference antenna 2 and unsounded antenna 3, between reference antenna 4 and unsounded antenna 5, and between reference antenna 6 and unsounded antenna 7. In another example, in the uniform grouping shown by reference number 452, the UE may report an intra-group correlation between reference antenna 0 and unsounded antennas 1, 2, and 3, and an intra-group correlation between reference antenna 4 and unsounded antennas 5, 6, and 7. In another example, in the non-uniform grouping shown by reference number 454, the UE may sound y antennas in the first group and z antennas in the second group, where $1 \leq y \leq 4$ and $1 \leq z \leq 2$, and may report respective intra-group correlations between the reference antennas and the unsounded antennas in each antenna group. In this way, the base station may use the intra-group correlation to estimate channels for unsounded antennas within a group based on the channel estimates of the (sounded) reference antennas within the same group.

As indicated above, FIGS. 4A-4B are provided as an example. Other examples may differ from what is described with regard to FIGS. 4A-4B.

Figure 5A:
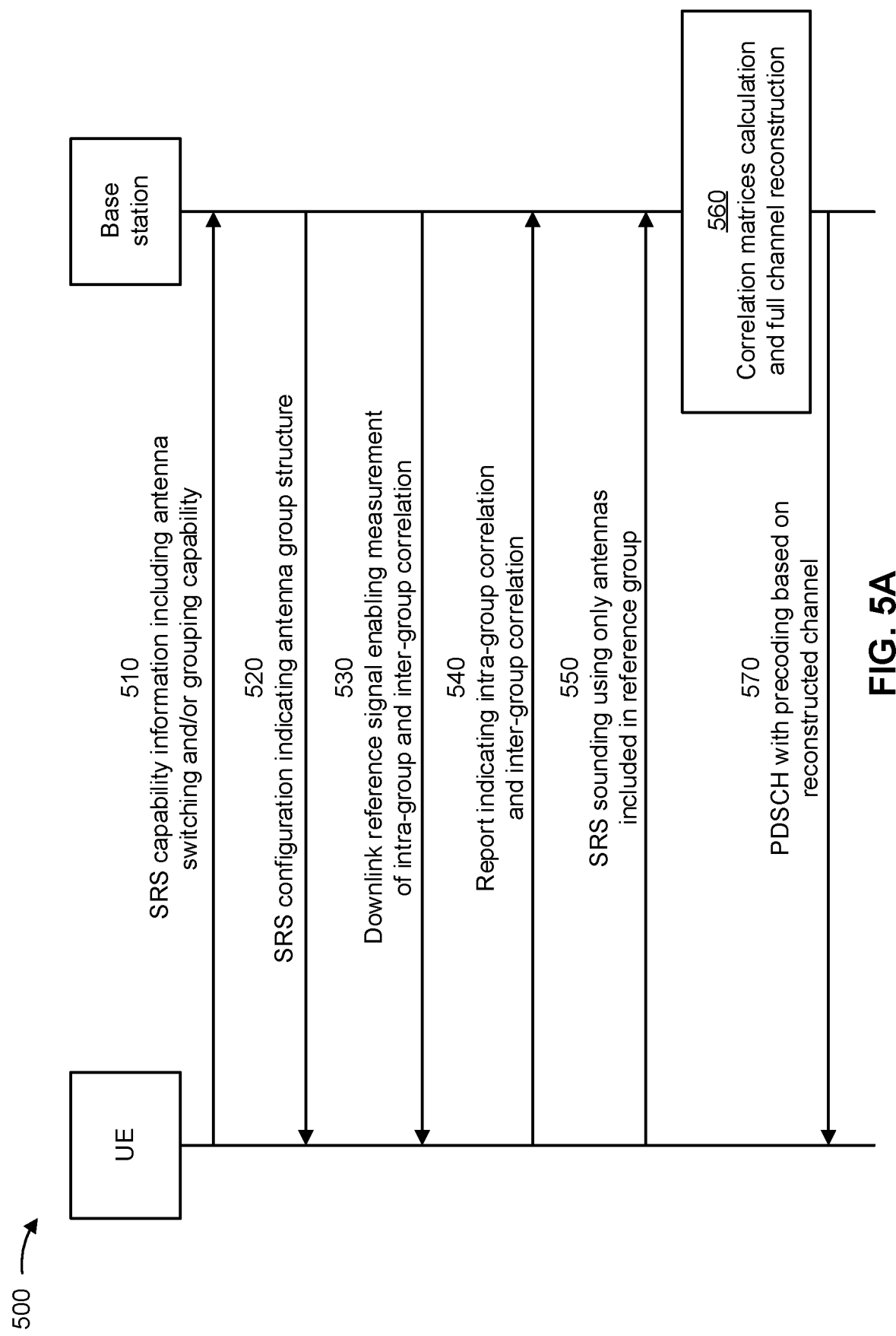
FIGS. 5A-5B are diagrams illustrating an example of signaling UE antenna group preferences and antenna group correlation, in accordance with the present disclosure.
Figure 5B:
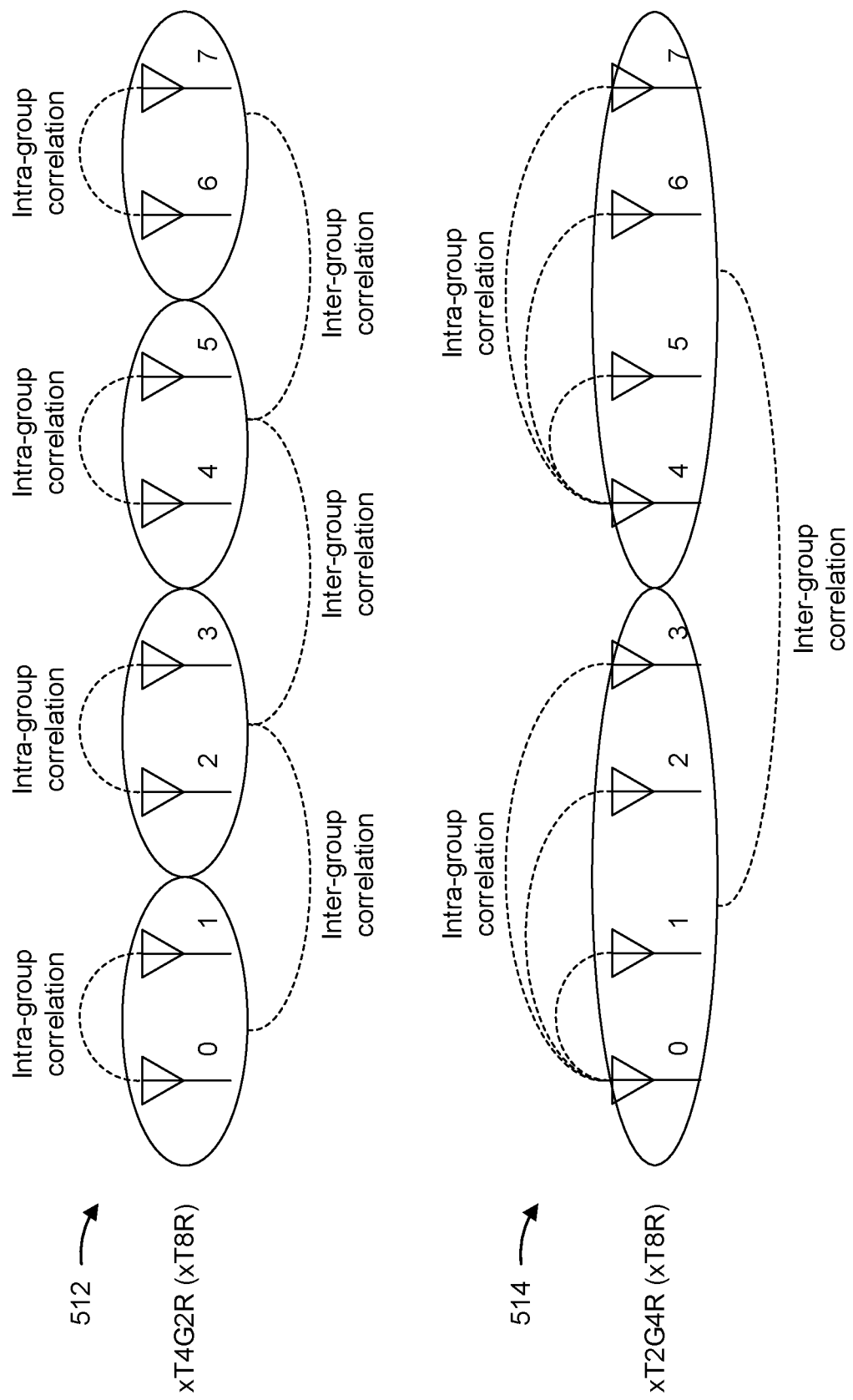

FIGS. 5A-5B are diagrams illustrating an example 500 of signaling UE antenna group preferences and antenna group correlation, in accordance with the present disclosure. As shown in FIG. 5A, example 500 includes communication between a base station (e.g., base station 110) and a UE (e.g., UE 120), which may be included in a wireless network (e.g., wireless network 100). In some aspects, as described herein, the UE may be configured to transmit an SRS that carries information that the base station uses for uplink channel estimation using partial spatial sounding. For example, as described herein, the UE may be equipped with an antenna array (e.g., a transceiver of the UE 120, may be equipped with an antenna array as described with reference to FIG. 2) that can be divided into multiple groups, one of which may be configured as a reference group. Accordingly, the UE may transmit the SRS using only one or more antennas included in the reference group, and may report an inter-group correlation to the base station to enable full channel reconstruction at the base station based on measurements of the SRS that is transmitted using the one or more antennas included in the reference group. Furthermore, in some aspects, one or more antennas in the reference group may be configured as reference antennas (e.g., in a similar manner as described above with reference to FIGS. 4A-4B), whereby the base station may estimate channels for all of the antennas in the reference group based on an intra-group correlation with the reference group and then estimate a full channel matrix for all of the antennas equipped at the UE based on the inter-group correlation between the reference group and the other group(s).

For example, as shown in FIG. 5A, and by reference number 510, the UE may transmit, and the base station may receive, SRS capability information that includes antenna switching and/or antenna grouping capability information. In some aspects, the SRS capability information may be signaled to the base station in a MAC-CE or uplink control information (UCI) in dedicated uplink resources, and the SRS capability information may indicate that the UE has a capability to divide an antenna array into multiple antenna groups that include a uniform number of antenna elements per antenna group or a non-uniform number of antenna elements per antenna group. In such cases, the SRS capability information may further indicate one or more recommendations or preferences for the antenna group structure. For example, referring to FIG. 5B, reference number 512 refers to an example uniform antenna group structure represented by the expression xT4G2R, where the UE is equipped with eight antennas that can be divided into four antenna groups with two antennas per antenna group. In another example, reference number 514 refers to a uniform antenna group structure represented by the expression xT2G4R, where the eight antennas equipped at the UE can be divided into two antenna groups with four antennas per antenna group.

Accordingly, in cases where the UE signals one or more recommendations or preferences for a uniform antenna group structure, the UE may indicate a number of antennas that are equipped at the UE and one or more recommendations for the number of antenna groups, which may implicitly indicate the number of antennas per antenna group. Additionally, or alternatively, in cases where the UE signals one or more recommendations for a non-uniform antenna group structure, the UE may indicate a recommended number of antenna groups and a recommended number of antennas per antenna group. Furthermore, the SRS capability information signaled to the base station may include a recommendation or preference to configure, define, or otherwise designate one of the antenna groups to be a reference group such that the UE can measure and report inter-group correlation to the base station based on the reference group. Furthermore, in some aspects, the SRS capability information may include one or more recommendations regarding one or more antennas to configure, define, or otherwise designate as reference antennas within each group such that the UE can measure and report intra-group correlation to the base station for each antenna group.

In some aspects, the UE may be configured to communicate with the base station using one or more frequencies, and the recommended or preferred antenna group structures that are signaled to the base station may be specific to certain frequency resources. For example, the recommended or preferred antenna group structures (e.g., including the number of antenna groups, the number of antennas per antenna group, the antenna group to be designated the reference group, and/or the antennas within each group to be designated reference antennas) may be signaled for a specific bandwidth part, component carrier, or frequency range, among other examples. Accordingly, each bandwidth part, component carrier, or frequency range that the UE uses to communicate with the base station may be associated with one or more recommendations or preferences for the antenna group structure.

As further shown in FIG. 5A, and by reference number 520, the base station may transmit, and the UE may receive, an SRS configuration that indicates the antenna group structure to be configured at the UE. For example, in some aspects, the SRS configuration may generally indicate one or more SRS resource sets that include one or more time and/or frequency resources in which the UE is to transmit an SRS, one or more antenna ports that the UE is to use to transmit the SRS, and/or a use case for the SRS (e.g., antenna switching, codebook, non-codebook, or beam management). Furthermore, as described herein, the SRS configuration may indicate an antenna group structure that includes a number of antenna groups and/or a number of antenna elements per antenna group. For example, in some aspects, the SRS configuration may be indicated in an RRC message, a MAC-CE, or DCI, which may have a flag to indicate whether the antenna group structure is uniform (with the same number of antennas per group), or non-uniform (with different numbers of antenna elements in different groups, or where at least one group has a different number of antenna element than at least one other group). In cases where the flag indicates that the antenna structure is uniform, the SRS configuration that indicates the antenna group structure may indicate a number of antenna groups, which may implicitly indicate the number of antennas per antenna group. Alternatively, where the flag indicates that the antenna structure is non-uniform, the SRS configuration that indicates the antenna group structure may indicate a number of antenna groups and may further indicate the number of antenna elements included in each respective group. Furthermore, in some aspects, the SRS configuration may indicate one of the antenna groups to be designated the reference group and may further indicate one or more antennas in each antenna group to be designated the reference antennas. In some aspects, the base station may select the antenna group structure indicated in the SRS configuration from the one or more recommended or preferred antenna group structures signaled by the UE (e.g., based on a configuration associated with an estimator that the base station uses for channel estimation or prediction). Further, the antenna group structure indicated in the SRS configuration may be associated with a specific bandwidth part, component carrier, or frequency range.

As further shown in FIG. 5A, and by reference number 530, the base station may transmit, and the UE may receive, one or more downlink reference signals to enable the UE to measure intra-group correlations and inter-group correlations based on the antenna group structure indicated in the SRS configuration. For example, as described above, the antenna group structure may generally divide the antennas equipped at the UE into multiple uniform or non-uniform groups, one of which is designated a reference group. Furthermore, the antenna group structure may designate, within each group, one or more antennas to be configured as reference antennas. Accordingly, the UE may receive the downlink reference signal (e.g., a CSI-RS) at each antenna equipped at the UE, and the UE may measure an intra-group correlation within each antenna group based on measurements of the downlink reference signal. Furthermore, the UE may measure an inter-group correlation between different antenna groups based on the reference antennas in each group (e.g., the inter-group correlation may be measured as the correlation between the reference antennas per group).

As further shown in FIG. 5A, and by reference number 540, the UE may transmit, and the base station may receive, a report that indicates the intra-group correlation between the antennas in each antenna group and the inter-group correlation between the antennas in different antenna groups. In some aspects, as described herein, a size of the report may generally depend on the number of antenna groups that are configured at the UE, as the report may have a larger payload size as the number of number of antenna groups increases to accommodate additional inter-group correlation information. For example, referring to reference number 512 in FIG. 5B, the report may include three inter-group correlation matrices for a uniform antenna group structure that includes four antenna groups with two antennas per group, or one inter-group correlation matrix for a uniform antenna group structure that includes two antenna groups with four antennas per group. Accordingly, in some cases, the antenna group structures that are recommended by the UE and/or selected by the base station may depend on one or more parameters that relate to the payload size of the report that indicates the intra-group correlation between the antennas in each antenna group and the inter-group correlation between the antennas in different antenna groups (e.g., a UE that has a relatively low maximum bandwidth capability may recommend a smaller number of antenna groups with more antennas per group to constrain the size of the report).

In some aspects, as described above, the report that the UE transmits to the base station may indicate an inter-group correlation between the antennas in different groups. For example, in some aspects, the report may indicate the inter-group correlation between a certain antenna group and the reference group and/or the inter-group correlation between the reference group and all other antenna groups. Additionally, or alternatively, the report may indicate the inter-group correlation between a certain antenna and all other antenna groups (including the reference group and any other non-reference antenna groups). In such cases, the UE may configure the report such that there is no repetition among the inter-group correlation(s) indicated in the report (e.g., to reduce a payload size of the report and/or avoid redundancy in the report, among other examples). For example, if the UE is configured with a set of antennas that are divided into four groups, which may be referred to herein as group x, group y, group z, and group e, and group y is configured as the reference group, the report transmitted by the UE may indicate the inter-group correlation between group x and group y, the inter-group correlation between group z and group y, and the inter-group correlation between group e and group y (e.g., the report indicates a respective correlation between the reference group and each non-reference group). In another example, the report indicates the inter-group correlation between group x and group y, between group x and group z, between group x and group e, between group y and group z, between group y and group e, between group z and group e, and/or any suitable combination thereof (e.g., the report indicates any suitable permutation of correlations between different antenna groups without repetition). Furthermore, as described herein, the inter-group correlation between any two antenna groups may refer to a correlation between only the reference antennas in the respective antenna groups and/or a correlation between all of the antennas in the respective antenna groups.

As further shown in FIG. 5A, and by reference number 550, the UE may perform SRS sounding using one or more antennas included in the reference group. For example, as described herein, the UE may use only the one or more antennas in the reference group to transmit the SRS, and may refrain from using the antennas in other groups to transmit the SRS. Furthermore, in some aspects, the UE may use only one or more reference antennas in the reference group to transmit the SRS, and may refrain from using other antennas in the reference group to transmit the SRS. Alternatively, in some aspects, the UE may use all of the antennas in the reference group to transmit the SRS. In this way, by sounding only a portion of the antennas equipped at the UE (e.g., only the antennas in the reference group, or only the reference antennas in the reference group), the SRS transmission may consume significantly less resources relative to transmitting the SRS using all of the antenna groups and/or all of the antennas equipped at the UE. For example, transmitting an SRS using an antenna configuration of 2T8R may generally require four time resources (e.g., symbols), whereas transmitting an SRS using an antenna configuration of 2T4G2R (e.g., dividing the antenna array into four groups with two antennas per group, and sounding two antennas) may require only two time resources. Furthermore, an antenna configuration of 2T8R may need two ports per resource whereas an antenna configuration of 1T4G2R may need one port per resource, whereby sounding only one or more antennas within the reference group may reduce the number of SRS ports that are needed (thereby increasing a power per port).

Accordingly, sounding only the one or more antennas in the reference group may reduce the resources and/or insertion loss for the SRS transmission. Furthermore, by signaling the intra-group correlation among antennas in each antenna group (e.g., relative to the reference antenna(s) in each antenna group) and the inter-group correlation between different antenna groups (e.g., relative to the reference group), the base station may estimate a full channel matrix for all of the antennas equipped at the UE based only on measurements of the SRS that transmitted using the one or more antennas included in the reference group. For example, as further shown in FIG. 5A, and by reference number 560, the base station may calculate one or more correlation matrices and reconstruct a full channel for all of the antennas equipped at the UE based on the measurements of the SRS transmitted using the antennas in the reference group. For example, in cases where the UE transmits the SRS using only the reference antennas in the reference group, the base station may calculate correlation matrices for any unsounded antennas in the reference group based on the estimated channel for the reference antennas and the intra-group correlation within the reference group (e.g., given the estimated channel for the reference antennas, as determined from the measurements of the SRS transmission, the base station may estimate the channels for the unsounded antennas based on the intra-group correlation). Furthermore, the base station may calculate correlation matrices to estimate channels for antennas in other (unsounded) antenna groups based on the inter-group correlation relative to the reference group. In this way, as further shown in FIG. 5A, and by reference number 570, the base station may transmit a physical downlink shared channel (PDSCH) to the UE with a precoding that is based on the fully reconstructed channel that is determined from the measurements of the SRS in combination with the intra-group and inter-group correlations reported by the UE. Furthermore, by signaling the intra-group and inter-group correlations to the base station, the channel estimation performance at the base station may be comparable to sounding all of the antennas at the UE.

For example, simulation results of partial antenna group sounding based on a clustered delay line (CDL) channel model (e.g., CDL-B, as defined in 3GPP TR 38.900) have shown that sounding four out of eight antennas and signaling an intra-group and inter-group correlation achieves similar performance as sounding all eight antennas. Furthermore, the simulation results have shown that sounding four out of eight antennas and signaling an intra-group and/or inter-group correlation achieves better performance (e.g., an approximately 1.5 decibel (dB) gain) relative to a partial sounding of four antennas without signaling the intra-group correlation and/or inter-group correlation.

As indicated above, FIGS. 5A-5B are provided as an example. Other examples may differ from what is described with regard to FIGS. 5A-5B.

Figure 6:
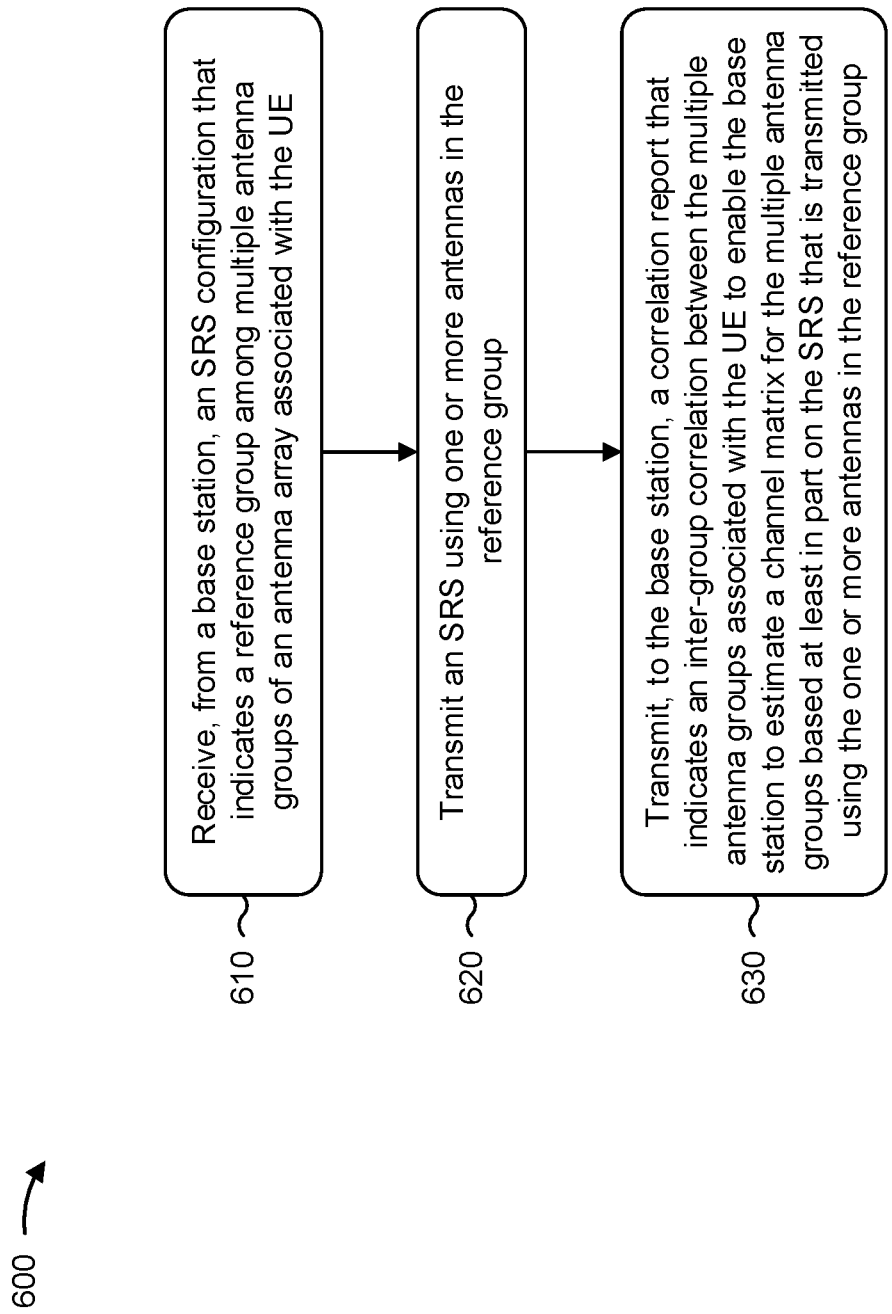
FIGS. 6-7 are diagrams illustrating example processes associated with UE antenna group preferences and antenna group correlation, in accordance with the present disclosure.

FIG. 6 is a diagram illustrating an example process 600 performed, for example, by a UE, in accordance with the present disclosure. Example process 600 is an example where the UE (e.g., UE 120) performs operations associated with signaling antenna group preferences and antenna group correlation.

As shown in FIG. 6, in some aspects, process 600 may include receiving, from a base station, an SRS configuration that indicates a reference group among multiple antenna groups of an antenna array associated with the UE (block 610). For example, the UE (e.g., using reception component 802, depicted in FIG. 8) may receive, from a base station, an SRS configuration that indicates a reference group among multiple antenna groups of an antenna array associated with the UE, as described above, for example, with reference to FIG. 5A and/or FIG. 5B.

As further shown in FIG. 6, in some aspects, process 600 may include transmitting an SRS using one or more antennas in the reference group (block 620). For example, the UE (e.g., using transmission component 804, depicted in FIG. 8) may transmit an SRS using one or more antennas in the reference group, as described above, for example, with reference to FIG. 5A and/or FIG. 5B.

As further shown in FIG. 6, in some aspects, process 600 may include transmitting, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group (block 630). For example, the UE (e.g., using transmission component 804, depicted in FIG. 8) may transmit, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group, as described above, for example, with reference to FIG. 5A and/or FIG. 5B.

Process 600 may include additional aspects, such as any single aspect or any combination of aspects described below and/or in connection with one or more other processes described elsewhere herein.

In a first aspect, the correlation report further indicates an intra-group correlation between multiple antennas within each antenna group.

In a second aspect, alone or in combination with the first aspect, a size of the correlation report is based at least in part on a number of the multiple antenna groups.

In a third aspect, alone or in combination with one or more of the first and second aspects, process 600 includes identifying one or more reference antennas within each antenna group, and measuring the inter-group correlation between the multiple antenna groups based at least in part on a correlation between the one or more reference antennas within each of the multiple antenna groups.

In a fourth aspect, alone or in combination with one or more of the first through third aspects, process 600 includes transmitting, to the base station, signaling that indicates, among the multiple antenna groups associated with the UE, one or more antenna groups recommended to be configured as the reference group.

In a fifth aspect, alone or in combination with one or more of the first through fourth aspects, the SRS configuration indicates a selection of the reference group among the one or more antenna groups that are recommended to be configured as the reference group.

In a sixth aspect, alone or in combination with one or more of the first through fifth aspects, process 600 includes transmitting, to the base station, antenna grouping capability information that indicates one or more recommendations for an antenna group structure that includes a number of the multiple antenna groups and a number of antennas per antenna group.

In a seventh aspect, alone or in combination with one or more of the first through sixth aspects, the antenna grouping capability information further indicates, for at least one of the one or more recommendations, a non-uniform number of antennas per antenna group.

In an eighth aspect, alone or in combination with one or more of the first through seventh aspects, the SRS configuration further indicates a selection of the antenna group structure from the one or more recommendations.

In a ninth aspect, alone or in combination with one or more of the first through eighth aspects, the one or more recommendations for the antenna group structure and the selection of the antenna group structure are associated with a specific bandwidth part, component carrier, or frequency range.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
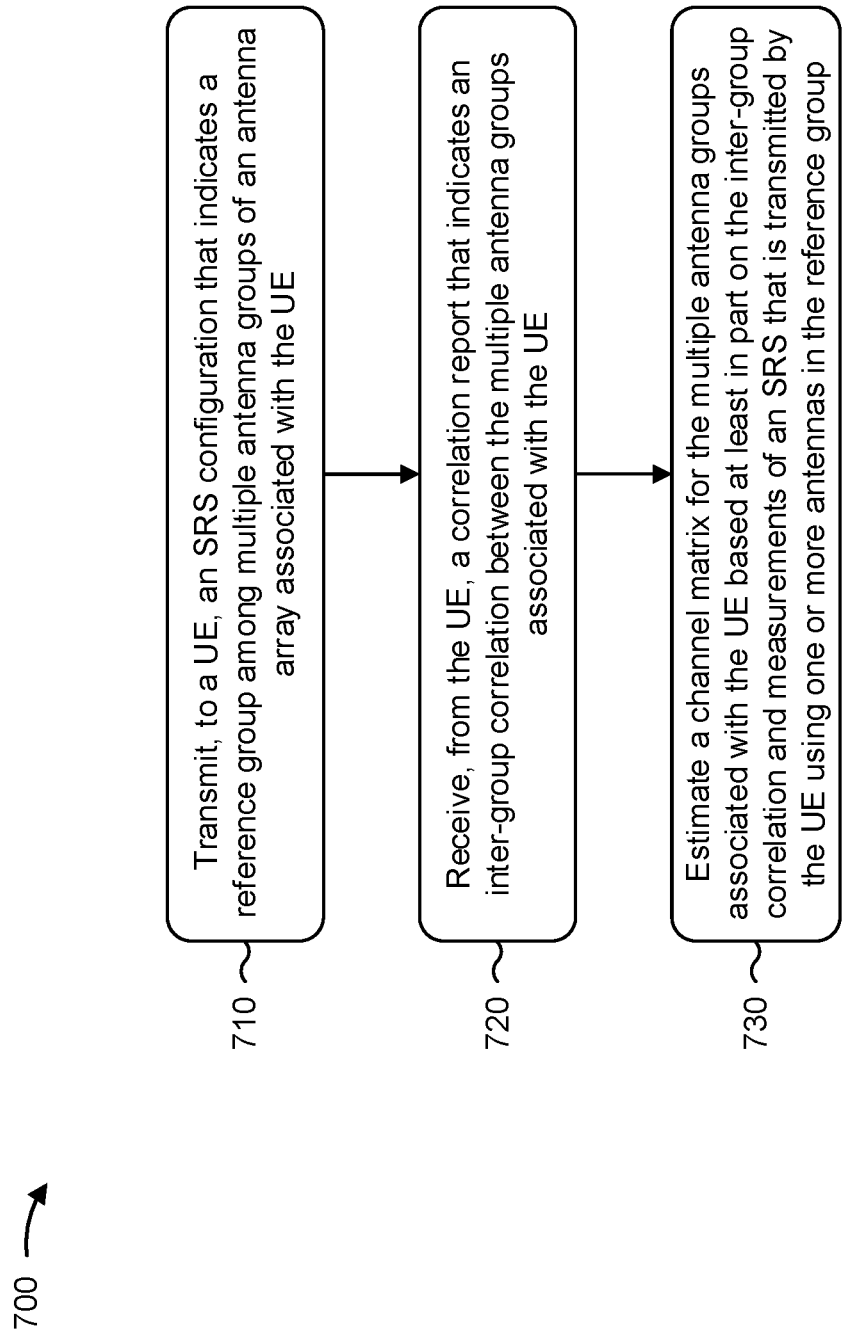

FIG. 7 is a diagram illustrating an example process 700 performed, for example, by a base station, in accordance with the present disclosure. Example process 700 is an example where the base station (e.g., base station 110) performs operations associated with antenna group preferences and antenna group correlation signaled by a UE.

As shown in FIG. 7, in some aspects, process 700 may include transmitting, to a UE, an SRS configuration that indicates a reference group among multiple antenna groups of an antenna array associated with the UE (block 710). For example, the base station (e.g., using transmission component 904, depicted in FIG. 9) may transmit, to a UE, an SRS configuration that indicates a reference group among multiple antenna groups of an antenna array associated with the UE, as described above, for example, with reference to FIG. 5A and/or FIG. 5B.

As further shown in FIG. 7, in some aspects, process 700 may include receiving, from the UE, a correlation report that indicates an inter-group correlation between the multiple antenna groups associated with the UE (block 720). For example, the base station (e.g., using reception component 902, depicted in FIG. 9) may receive, from the UE, a correlation report that indicates an inter-group correlation between the multiple antenna groups associated with the UE, as described above, for example, with reference to FIG. 5A and/or FIG. 5B.

As further shown in FIG. 7, in some aspects, process 700 may include estimating a channel matrix for the multiple antenna groups associated with the UE based at least in part on the inter-group correlation and measurements of an SRS that is transmitted by the UE using one or more antennas in the reference group (block 730). For example, the base station (e.g., using channel estimation component 908, depicted in FIG. 9) may estimate a channel matrix for the multiple antenna groups associated with the UE based at least in part on the inter-group correlation and measurements of an SRS that is transmitted by the UE using one or more antennas in the reference group, as described above, for example, with reference to FIG. 5A and/or FIG. 5B.

Process 700 may include additional aspects, such as any single aspect or any combination of aspects described below and/or in connection with one or more other processes described elsewhere herein.

In a first aspect, process 700 includes reconstructing a wireless channel between the base station and the UE based at least in part on the estimated channel matrix for the multiple antenna groups, and transmitting, to the UE, a PDSCH having a precoding that is based at least in part on the reconstructed wireless channel.

In a second aspect, alone or in combination with the first aspect, the correlation report further indicates an intra-group correlation between multiple antennas within each antenna group.

In a third aspect, alone or in combination with one or more of the first and second aspects, a size of the correlation report is based at least in part on a number of the multiple antenna groups.

In a fourth aspect, alone or in combination with one or more of the first through third aspects, process 700 includes receiving, from the UE, signaling that indicates, among the multiple antenna groups associated with the UE, one or more antenna groups recommended to be configured as the reference group.

In a fifth aspect, alone or in combination with one or more of the first through fourth aspects, the SRS configuration indicates a selection of the reference group among the one or more antenna groups that are recommended to be configured as the reference group.

In a sixth aspect, alone or in combination with one or more of the first through fifth aspects, process 700 includes receiving, from the UE, antenna grouping capability information that indicates one or more recommendations for an antenna group structure that includes a number of the multiple antenna groups and a number of antennas per antenna group.

In a seventh aspect, alone or in combination with one or more of the first through sixth aspects, the antenna grouping capability information further indicates, for at least one of the one or more recommendations, a non-uniform number of antennas per antenna group.

In an eighth aspect, alone or in combination with one or more of the first through seventh aspects, the SRS configuration further indicates a selection of the antenna group structure from the one or more recommendations.

In a ninth aspect, alone or in combination with one or more of the first through eighth aspects, the one or more recommendations for the antenna group structure and the selection of the antenna group structure are associated with a specific bandwidth part, component carrier, or frequency range.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
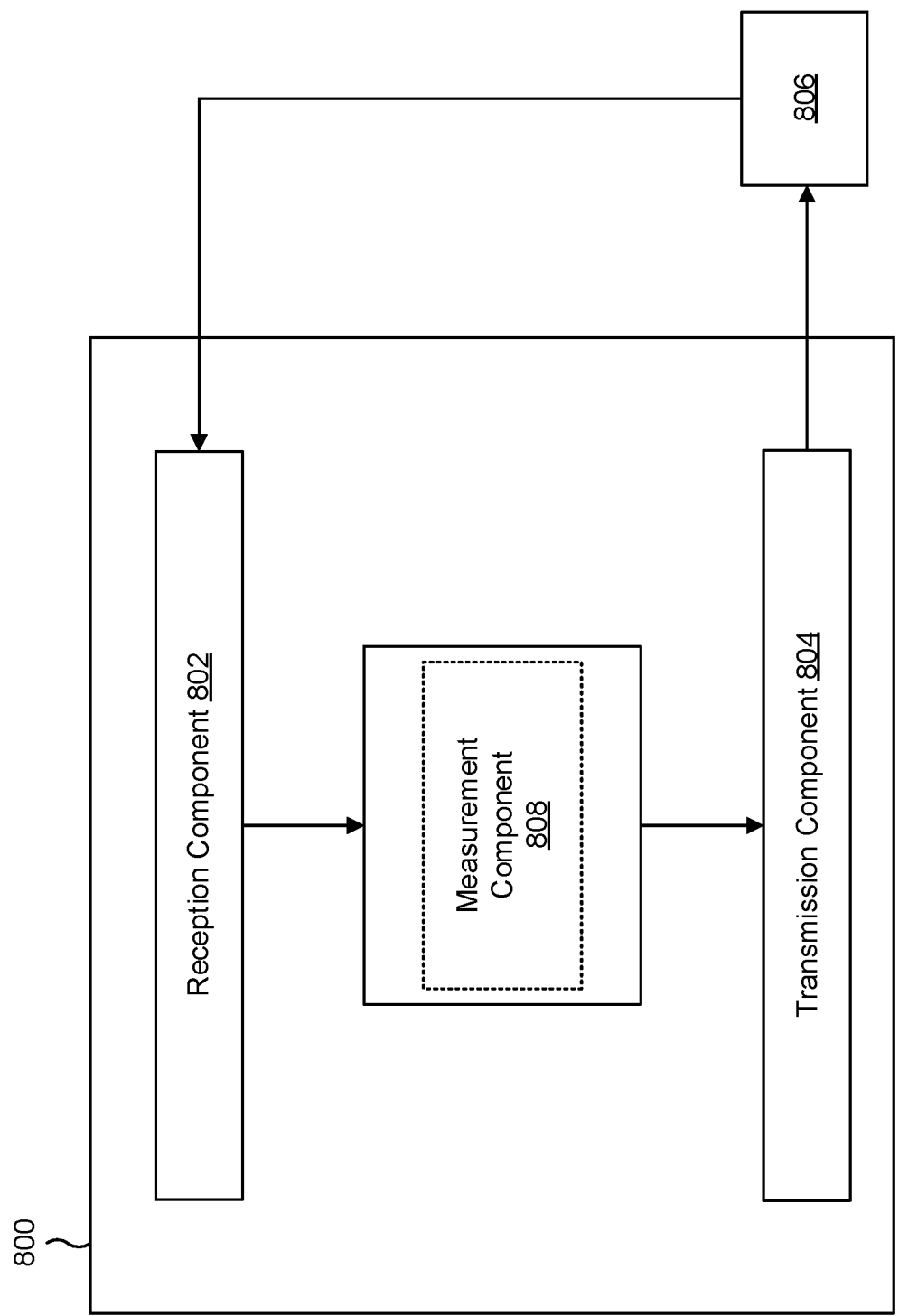
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a measurement component 808, among other examples.

In some aspects, the apparatus 800 may be configured to perform one or more operations described herein in connection with FIG. 5A-5B. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from a base station, an SRS configuration that indicates a reference group among multiple antenna groups of an antenna array associated with the UE. The transmission component 804 may transmit an SRS using one or more antennas in the reference group. The transmission component 804 may transmit, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

The measurement component 808 may identify one or more reference antennas within each antenna group. The measurement component 808 may measure the inter-group correlation between the multiple antenna groups based at least in part on a correlation between the one or more reference antennas within each of the multiple antenna groups.

The transmission component 804 may transmit, to the base station, signaling that indicates, among the multiple antenna groups associated with the UE, one or more antenna groups recommended to be configured as the reference group.

The transmission component 804 may transmit, to the base station, antenna grouping capability information that indicates one or more recommendations for an antenna group structure that includes a number of the multiple antenna groups and a number of antennas per antenna group.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
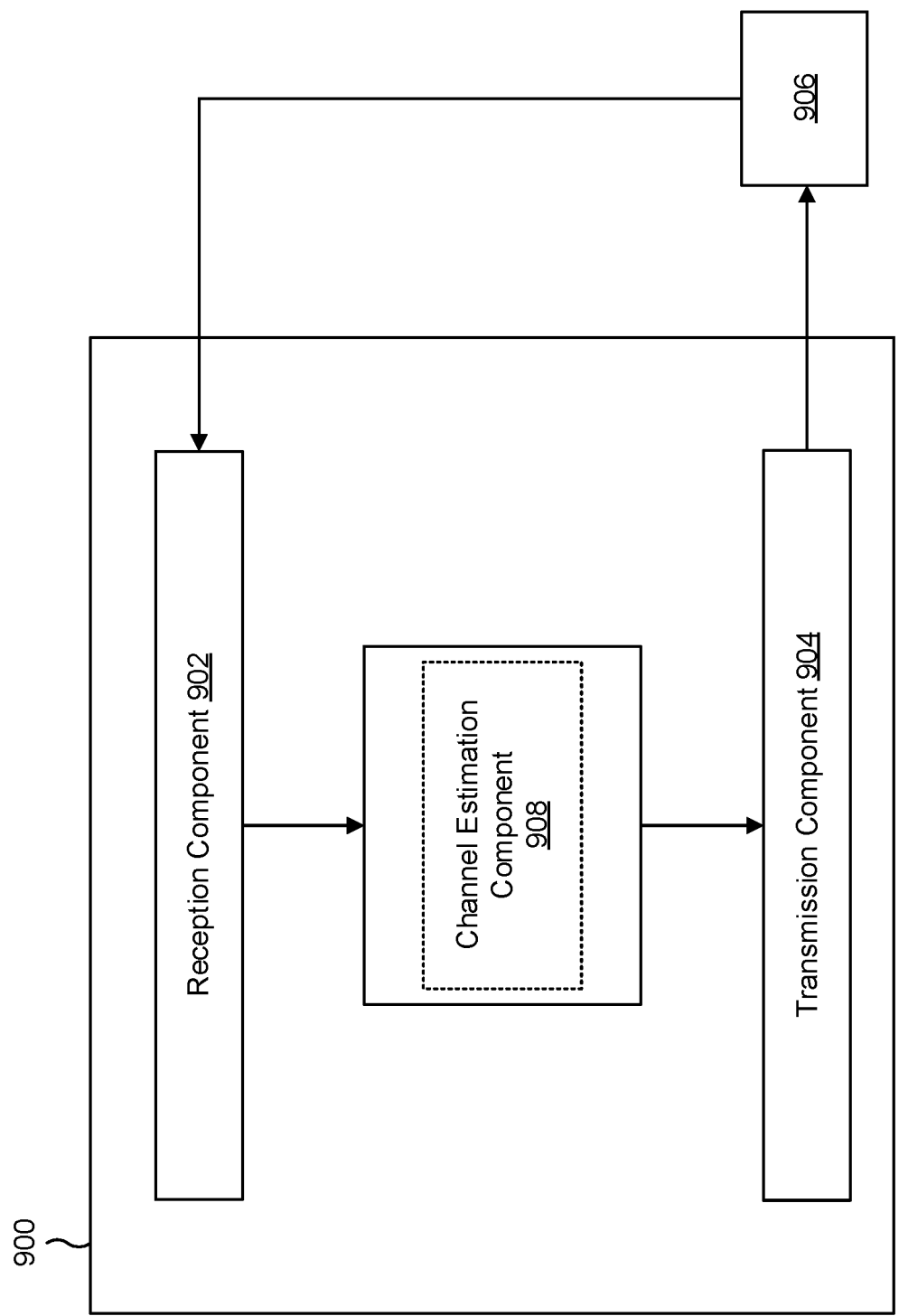

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a channel estimation component 908, among other examples.

In some aspects, the apparatus 900 may be configured to perform one or more operations described herein in connection with FIG. 5A-5B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE, an SRS configuration that indicates a reference group among multiple antenna groups of an antenna array associated with the UE. The reception component 902 may receive, from the UE, a correlation report that indicates an inter-group correlation between the multiple antenna groups associated with the UE. The channel estimation component 908 may estimate a channel matrix for the multiple antenna groups associated with the UE based at least in part on the inter-group correlation and measurements of an SRS that is transmitted by the UE using one or more antennas in the reference group.

The channel estimation component 908 may reconstruct a wireless channel between the base station and the UE based at least in part on the estimated channel matrix for the multiple antenna groups. The transmission component 904 may transmit, to the UE, a PDSCH having a precoding that is based at least in part on the reconstructed wireless channel.

The reception component 902 may receive, from the UE, signaling that indicates, among the multiple antenna groups associated with the UE, one or more antenna groups recommended to be configured as the reference group.

The reception component 902 may receive, from the UE, antenna grouping capability information that indicates one or more recommendations for an antenna group structure that includes a number of the multiple antenna groups and a number of antennas per antenna group.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a base station, an SRS configuration that indicates a reference group among multiple antenna groups of an antenna array associated with the UE; transmitting an SRS using one or more antennas in the reference group; and transmitting, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

Aspect 2: The method of Aspect 1, wherein the correlation report further indicates an intra-group correlation between multiple antennas within each antenna group.

Aspect 3: The method of any of Aspects 1-2, wherein a size of the correlation report is based at least in part on a number of the multiple antenna groups.

Aspect 4: The method of any of Aspects 1-3, further comprising: identifying one or more reference antennas within each antenna group; and measuring the inter-group correlation between the multiple antenna groups based at least in part on a correlation between the one or more reference antennas within each of the multiple antenna groups.

Aspect 5: The method of any of Aspects 1-4, further comprising: transmitting, to the base station, signaling that indicates, among the multiple antenna groups associated with the UE, one or more antenna groups recommended to be configured as the reference group.

Aspect 6: The method of Aspect 5, wherein the SRS configuration indicates a selection of the reference group among the one or more antenna groups that are recommended to be configured as the reference group.

Aspect 7: The method of any of Aspects 1-6, further comprising: transmitting, to the base station, antenna grouping capability information that indicates one or more recommendations for an antenna group structure that includes a number of the multiple antenna groups and a number of antennas per antenna group.

Aspect 8: The method of Aspect 7, wherein the antenna grouping capability information further indicates, for at least one of the one or more recommendations, a non-uniform number of antennas per antenna group.

Aspect 9: The method of any of Aspects 7-8, wherein the SRS configuration further indicates a selection of the antenna group structure from the one or more recommendations.

Aspect 10: The method of Aspect 9, wherein the one or more recommendations for the antenna group structure and the selection of the antenna group structure are associated with a specific bandwidth part, component carrier, or frequency range.

Aspect 11: A method of wireless communication performed by a base station, comprising: transmitting, to a UE, an SRS configuration that indicates a reference group among multiple antenna groups of an antenna array associated with the UE; receiving, from the UE, a correlation report that indicates an inter-group correlation between the multiple antenna groups associated with the UE; and estimating a channel matrix for the multiple antenna groups associated with the UE based at least in part on the inter-group correlation and measurements of an SRS that is transmitted by the UE using one or more antennas in the reference group.

Aspect 12: The method of Aspect 11, further comprising: reconstructing a wireless channel between the base station and the UE based at least in part on the estimated channel matrix for the multiple antenna groups; and transmitting, to the UE, a PDSCH having a precoding that is based at least in part on the reconstructed wireless channel.

Aspect 13: The method of any of Aspects 11-12, wherein the correlation report further indicates an intra-group correlation between multiple antennas within each antenna group.

Aspect 14: The method of any of Aspects 11-13, wherein a size of the correlation report is based at least in part on a number of the multiple antenna groups.

Aspect 15: The method of any of Aspects 11-14, further comprising: receiving, from the UE, signaling that indicates, among the multiple antenna groups associated with the UE, one or more antenna groups recommended to be configured as the reference group.

Aspect 16: The method of Aspect 15, wherein the SRS configuration indicates a selection of the reference group among the one or more antenna groups that are recommended to be configured as the reference group.

Aspect 17: The method of any of Aspects 11-16, further comprising: receiving, from the UE, antenna grouping capability information that indicates one or more recommendations for an antenna group structure that includes a number of the multiple antenna groups and a number of antennas per antenna group.

Aspect 18: The method of Aspect 17, wherein the antenna grouping capability information further indicates, for at least one of the one or more recommendations, a non-uniform number of antennas per antenna group.

Aspect 19: The method of any of Aspects 17-18, wherein the SRS configuration further indicates a selection of the antenna group structure from the one or more recommendations.

Aspect 20: The method of Aspect 19, wherein the one or more recommendations for the antenna group structure and the selection of the antenna group structure are associated with a specific bandwidth part, component carrier, or frequency range.

Aspect 21: An apparatus for wireless communication at a device, comprising a processor; memory coupled with the processor; and instructions stored in the memory and executable by the processor to cause the apparatus to perform the method of any of Aspects 1-10.

Aspect 22: A device for wireless communication, comprising a memory and one or more processors coupled to the memory, the memory and the one or more processors configured to perform the method of any of Aspects 1-10.

Aspect 23: A device for wireless communication, comprising a memory, a transceiver comprising an antenna array, and one or more processors, coupled to the memory and the transceiver, configured to perform the method of any of Aspects 1-10.

Aspect 24: An apparatus for wireless communication, comprising at least one means for performing the method of any of Aspects 1-10.

Aspect 25: A non-transitory computer-readable medium storing code for wireless communication, the code comprising instructions executable by a processor to perform the method of any of Aspects 1-10.

Aspect 26: A non-transitory computer-readable medium storing a set of instructions for wireless communication, the set of instructions comprising one or more instructions that, when executed by one or more processors of a device, cause the device to perform the method of any of Aspects 1-10.

Aspect 27: An apparatus for wireless communication at a device, comprising a processor; memory coupled with the processor; and instructions stored in the memory and executable by the processor to cause the apparatus to perform the method of any of Aspects 11-20.

Aspect 28: A device for wireless communication, comprising a memory and one or more processors coupled to the memory, the memory and the one or more processors configured to perform the method of any of Aspects 11-20.

Aspect 29: A device for wireless communication, comprising a memory, a transceiver, and one or more processors, coupled to the memory and the transceiver, configured to perform the method of any of Aspects 11-20.

Aspect 30: An apparatus for wireless communication, comprising at least one means for performing the method of any of Aspects 11-20.

Aspect 31: A non-transitory computer-readable medium storing code for wireless communication, the code comprising instructions executable by a processor to perform the method of any of Aspects 11-20.

Aspect 32: A non-transitory computer-readable medium storing a set of instructions for wireless communication, the set of instructions comprising one or more instructions that, when executed by one or more processors of a device, cause the device to perform the method of any of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory;
    a transceiver comprising an antenna array; and
    one or more processors, coupled to the memory and the transceiver, configured to:
        receive, from a base station, via the transceiver, a sounding reference signal (SRS) configuration that indicates a reference group among multiple antenna groups of the antenna array;
        transmit, via the transceiver, an SRS using one or more antennas in the reference group; and
        transmit, to the base station, via the transceiver, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

2. The UE of claim 1, wherein the correlation report further indicates an intra-group correlation between multiple antennas within each antenna group of the multiple antenna groups.

3. The UE of claim 1, wherein a size of the correlation report is based at least in part on a number of the multiple antenna groups.

4. The UE of claim 1, wherein the one or more processors are further configured to:
    identify one or more reference antennas within each antenna group of the multiple antenna groups; and
    measure the inter-group correlation between the multiple antenna groups based at least in part on a correlation between the one or more reference antennas within the each antenna group of the multiple antenna groups.

5. The UE of claim 1, wherein the one or more processors are further configured to:
    transmit, to the base station, via the transceiver, signaling that indicates, among the multiple antenna groups associated with the UE, one or more antenna groups recommended to be configured as the reference group.

6. The UE of claim 5, wherein the SRS configuration indicates a selection of the reference group among the one or more antenna groups that are recommended to be configured as the reference group.

7. The UE of claim 1, wherein the one or more processors are further configured to:
    transmit, to the base station, via the transceiver, antenna grouping capability information that indicates one or more recommendations for an antenna group structure that includes a number of the multiple antenna groups and a number of antennas per antenna group.

8. The UE of claim 7, wherein the antenna grouping capability information further indicates, for at least one of the one or more recommendations, a non-uniform number of antennas per antenna group.

9. The UE of claim 7, wherein the SRS configuration further indicates a selection of the antenna group structure from the one or more recommendations.

10. The UE of claim 9, wherein the one or more recommendations for the antenna group structure and the selection of the antenna group structure are associated with a specific bandwidth part, component carrier, or frequency range.

11. A base station for wireless communication, comprising:
- a memory;
- a transceiver; and
- one or more processors, coupled to the memory and the transceiver, configured to:
  - transmit, to a user equipment (UE), via the transceiver, a sounding reference signal (SRS) configuration that indicates a reference group among multiple antenna groups of an antenna array associated with the UE;
  - receive, from the UE, via the transceiver, a correlation report that indicates an inter-group correlation between the multiple antenna groups associated with the UE; and
  - estimate a channel matrix for the multiple antenna groups associated with the UE based at least in part on the inter-group correlation and measurements of an SRS that is transmitted by the UE using one or more antennas in the reference group.

12. The base station of claim 11, wherein the one or more processors are further configured to:
- reconstruct a wireless channel between the base station and the UE based at least in part on the estimated channel matrix for the multiple antenna groups; and
- transmit, to the UE, via the transceiver, a physical downlink shared channel having a precoding that is based at least in part on the reconstructed wireless channel.

13. The base station of claim 11, wherein the correlation report further indicates an intra-group correlation between multiple antennas within each antenna group of the multiple antenna groups.

14. The base station of claim 11, wherein a size of the correlation report is based at least in part on a number of the multiple antenna groups.

15. The base station of claim 11, wherein the one or more processors are further configured to:
- receive, from the UE, via the transceiver, signaling that indicates, among the multiple antenna groups associated with the UE, one or more antenna groups recommended to be configured as the reference group.

16. The base station of claim 15, wherein the SRS configuration indicates a selection of the reference group among the one or more antenna groups that are recommended to be configured as the reference group.

17. The base station of claim 11, wherein the one or more processors are further configured to:
- receive, from the UE, via the transceiver, antenna grouping capability information that indicates one or more recommendations for an antenna group structure that includes a number of the multiple antenna groups and a number of antennas per antenna group.

18. The base station of claim 17, wherein the antenna grouping capability information further indicates, for at least one of the one or more recommendations, a non-uniform number of antennas per antenna group.

19. The base station of claim 17, wherein the SRS configuration further indicates a selection of the antenna group structure from the one or more recommendations.

20. The base station of claim 19, wherein the one or more recommendations for the antenna group structure and the selection of the antenna group structure are associated with a specific bandwidth part, component carrier, or frequency range.

21. A method of wireless communication performed by a user equipment (UE), comprising:
- receiving, from a base station, a sounding reference signal (SRS) configuration that indicates a reference group among multiple antenna groups of an antenna array associated with the UE;
- transmitting an SRS using one or more antennas in the reference group; and
- transmitting, to the base station, a correlation report that indicates an inter-group correlation between the multiple antenna groups associated with the UE to enable the base station to estimate a channel matrix for the multiple antenna groups based at least in part on the SRS that is transmitted using the one or more antennas in the reference group.

22. The method of claim 21, wherein a size of the correlation report is based at least in part on a number of the multiple antenna groups.

23. The method of claim 21, further comprising:
- identifying one or more reference antennas within each antenna group of the multiple antenna groups; and
- measuring the inter-group correlation between the multiple antenna groups based at least in part on a correlation between the one or more reference antennas within the each antenna group of the multiple antenna groups.

24. The method of claim 21, further comprising:
- transmitting, to the base station, signaling that indicates, among the multiple antenna groups associated with the UE, one or more antenna groups recommended to be configured as the reference group.

25. The method of claim 21, further comprising:
- transmitting, to the base station, antenna grouping capability information that indicates one or more recommendations for an antenna group structure that includes a number of the multiple antenna groups and a number of antennas per antenna group.

26. A method of wireless communication performed by a base station, comprising:
- transmitting, to a user equipment (UE), a sounding reference signal (SRS) configuration that indicates a reference group among multiple antenna groups of an antenna array associated with the UE;
- receiving, from the UE, a correlation report that indicates an inter-group correlation between the multiple antenna groups associated with the UE; and
- estimating a channel matrix for the multiple antenna groups associated with the UE based at least in part on the inter-group correlation and measurements of an SRS that is transmitted by the UE using one or more antennas in the reference group.

27. The method of claim 26, further comprising:
- reconstructing a wireless channel between the base station and the UE based at least in part on the estimated channel matrix for the multiple antenna groups; and
- transmitting, to the UE, a physical downlink shared channel having a precoding that is based at least in part on the reconstructed wireless channel.

28. The method of claim 26, wherein a size of the correlation report is based at least in part on a number of the multiple antenna groups.

29. The method of claim 26, further comprising:
- receiving, from the UE, signaling that indicates, among the multiple antenna groups associated with the UE, one or more antenna groups recommended to be configured as the reference group.

30. The method of claim 26, further comprising:
- receiving, from the UE, antenna grouping capability information that indicates one or more recommendations for an antenna group structure that includes a number of the multiple antenna groups and a number of antennas per antenna group.

* * * * *